United States Patent
Chun

(10) Patent No.: US 9,922,641 B1
(45) Date of Patent: Mar. 20, 2018

(54) CROSS-LINGUAL SPEAKER ADAPTATION FOR MULTI-LINGUAL SPEECH SYNTHESIS

(71) Applicant: Google Inc., Mountain View, CA (US)

(72) Inventor: Byung Ha Chun, Epsom (GB)

(73) Assignee: Google LLC, Mountain View, CA (US)

( * ) Notice: Subject to any disclaimer, the term of this patent is extended or adjusted under 35 U.S.C. 154(b) by 584 days.

(21) Appl. No.: 13/665,390

(22) Filed: Oct. 31, 2012

Related U.S. Application Data

(60) Provisional application No. 61/708,297, filed on Oct. 1, 2012.

(51) Int. Cl.
  *G10L 13/00* (2006.01)
  *G10L 13/06* (2013.01)
  *G10L 15/06* (2013.01)
  *G10L 15/07* (2013.01)
  *G10L 15/02* (2006.01)
  *G10L 21/013* (2013.01)

(52) U.S. Cl.
  CPC ............ *G10L 15/063* (2013.01); *G10L 15/07* (2013.01); *G10L 15/02* (2013.01); *G10L 2015/025* (2013.01); *G10L 2021/0135* (2013.01)

(58) Field of Classification Search
  CPC ..... G10L 15/005; G10L 15/06; G10L 13/033; G10L 13/02; G10L 2021/0135
  USPC ............................. 704/2, 3, 4, 258, 261, 266
  See application file for complete search history.

(56) References Cited

U.S. PATENT DOCUMENTS

| | | | |
|---|---|---|---|
| 5,729,694 A * | 3/1998 | Holzrichter et al. | 705/17 |
| 7,275,032 B2 * | 9/2007 | Macleod | 704/243 |
| 7,580,839 B2 * | 8/2009 | Tamura et al. | 704/258 |
| 7,593,842 B2 * | 9/2009 | Rousseau | 704/2 |
| 7,765,101 B2 * | 7/2010 | En-Najjary et al. | 704/246 |
| 7,848,924 B2 * | 12/2010 | Nurminen et al. | 704/222 |
| 7,912,727 B2 * | 3/2011 | Gao et al. | 704/277 |
| 8,073,696 B2 * | 12/2011 | Kato et al. | 704/260 |
| 8,170,878 B2 * | 5/2012 | Liu et al. | 704/260 |
| 8,204,739 B2 * | 6/2012 | Waibel et al. | 704/10 |
| 2002/0072909 A1 * | 6/2002 | Eide et al. | 704/268 |
| 2004/0230420 A1 * | 11/2004 | Kadambe et al. | 704/205 |
| 2005/0187773 A1 * | 8/2005 | Filoche et al. | 704/260 |
| 2006/0253272 A1 * | 11/2006 | Gao et al. | 704/2 |
| 2007/0208566 A1 * | 9/2007 | En-Najjary et al. | 704/269 |

(Continued)

OTHER PUBLICATIONS

Lamel, Lori, et al. "Speech recognition for machine translation in Quaero." Proceedings of the International Workshop on Spoken Language Translation (IWSLT), San Francisco, CA. 2011.*

(Continued)

*Primary Examiner* — Michael Ortiz Sanchez
(74) *Attorney, Agent, or Firm* — Fish & Richardson P.C.

(57) ABSTRACT

The subject matter of the disclosure is embodied in a method that includes receiving input speech data from a speaker in a first language, and estimating, based on a universal speech model, a speaker transform representing speaker characteristics associated with the input speech data. The method also includes accessing a speaker-independent speech model for generating speech data in a second language that is different from the first language. The method further includes modifying the speaker-independent speech model using the speaker transform to obtain a speaker-specific speech model, and generating speech data in the second language using the speaker-specific speech model.

26 Claims, 4 Drawing Sheets

(56) References Cited

U.S. PATENT DOCUMENTS

| | | | |
|---|---|---|---|
| 2008/0004858 A1* | 1/2008 | Gao et al. | 704/2 |
| 2009/0055160 A1* | 2/2009 | Gao et al. | 704/4 |
| 2009/0099841 A1* | 4/2009 | Chen | 704/9 |
| 2009/0281789 A1* | 11/2009 | Waibel et al. | 704/3 |
| 2010/0057435 A1* | 3/2010 | Kent et al. | 704/3 |
| 2010/0198577 A1* | 8/2010 | Chen et al. | 704/2 |
| 2011/0238407 A1* | 9/2011 | Kent | 704/3 |
| 2011/0270610 A1* | 11/2011 | Deng et al. | 704/236 |
| 2012/0173241 A1 | 7/2012 | Li et al. | |
| 2012/0253781 A1* | 10/2012 | Qian et al. | 704/2 |

OTHER PUBLICATIONS

"Machine translator speaks Chinese in your own voice," New Scientist blog post dated Nov. 9, 2012, found online at: http://www.newscientist.com/blog/onepercent/2012/11/miciroscofts-brainlike-tranlat.html.

Hattori et al., "Speaker-adaptive speech synthesis based on eigenvoice conversion and language dependent prosodic conversion in speech-to-speech translation," In INTERSPEECH—2011, pp. 2769-2772, 2011.

Qian et al., "A cross-language state sharing and mapping approach to bilingual (Mandarin-English) TTS", In IEEE Transactions on Audio, Speech, and Language Processing, vol. 17, No. 6, pp. 1231-1239, 2009.

Qian et al., "A frame mapping based HMM approach to cross-lingual voice transformation," In ICASSP-2011, pp. 5120-5123, 2011.

Wu et al., "State mapping based method for cross-lingual speaker adaptation in HMM-based speech synthesis", In INTERSPEECH-2009, pp. 528-531, 2009.

Zen et al., "*Statistical parametric speech synthesis based on speaker and language factorization,*" In IEEE Transactions on Audio, Speech, and Language Processing, 2012.

Kurimo et al., "Personalising speech-to-speech translation in the EMIME project," Proceedings of the ACL 2010 System Demonstrations, pp. 48-53, Jul. 13, 2010.

Liang et al., "A comparison of supervised and unsupervised cross-lingual speaker adaptation approaches for HMM-based speech synthesis," 2010 IEEE International Conference on Acoustics Speech and Signal Processing (ICASSP) pp. 4598-4601, Mar. 14-19, 2010.

Microsoft Research, "Turning a monolingual speaker into multi-lingual speaker," Microsoft Research [online], Apr. 20, 2012 [retrieved on Jun. 17, 2013] Retrieved from the Internet using the Wayback Machine: <URL: http://web.archive.org/web/20120420120027/http://research.microsoft.com/en-us/projects/mixedlangtts/default.aspx> 3 pages.

Oura et al., "Unsupervised Cross-Lingual Speaker Adaptation for HMM-Based Speech Synthesis," 2010 IEEE International Conference on Acoustics Speech and Signal Processing (ICASSP), pp. 4594-4597, Mar. 14-19, 2010.

Qian and Soong, "A unified trajectory tiling approach to high quality TTS and cross-lingual voice transformation," 2012 8th International Symposium on Chinese Spoken Language Processing (ISCSLP), Dec 5-8, 2012, pp. 165-169.

Lamel, Lori et al., "Speech Recognition for Machine Translation in Quaero", ISCA Archive, International Workshop on Spoken Language Translation 2011, San Francisco, CA, Dec. 8-9, 2011 (8 pages).

* cited by examiner

CROSS-LINGUAL SPEAKER ADAPTATION FOR MULTI-LINGUAL SPEECH SYNTHESIS

CROSS REFERENCE TO RELATED APPLICATION

This application claims priority to U.S. provisional application 61/708,297, filed on Oct. 1, 2012, the entire content of which is incorporated herein by reference.

TECHNICAL FIELD

This document relates to speech synthesis.

BACKGROUND

Speech synthesis involves generation of simulated human speech. Typically, computers are used to generate the simulated human speech from text input. For instance, a speech synthesizer produces speech signals that are sent to a speaker to provide an audible output.

SUMMARY

In general, the subject matter described in this specification can be embodied in a method that includes receiving input speech data from a speaker in a first language, and estimating, based on a universal speech model, a speaker transform representing speaker characteristics associated with the input speech data. The method also includes accessing a speaker-independent speech model for generating speech data in a second language that is different from the first language. The method further includes modifying the speaker-independent speech model using the speaker transform to obtain a speaker-specific speech model, and generating speech data in the second language using the speaker-specific speech model.

In another aspect, the subject matter described in this specification can be embodied in a system that includes a speech synthesis engine. The speech synthesis engine includes a processor and is configured to receive input speech data from a speaker in a first language, and estimate, based on a universal speech model, a speaker transform representing speaker characteristics associated with the input speech data. The speech synthesis engine is also configured to access a speaker-independent speech model for generating speech data in a second language that is different from the first language, and modify the speaker-independent speech model using the speaker transform to obtain a speaker-specific speech model. The speech synthesis engine is further configured to generate speech data in the second language using the speaker-specific speech model.

In another aspect, the subject matter described in this specification can be embodied in a computer program product comprising computer readable instructions encoded on a storage device. The instructions, when executed, cause one or more processors to perform operations that include receiving input speech data from a speaker in a first language, and estimating, based on a universal speech model, a speaker transform representing speaker characteristics associated with the input speech data. The operations also include accessing a speaker-independent speech model for generating speech data in a second language that is different from the first language. The operations further include modifying the speaker-independent speech model using the speaker transform to obtain a speaker-specific speech model, and generating speech data in the second language using the speaker-specific speech model.

Implementations can include one or more of the following. The universal speech model can include a Gaussian mixture model that represents a plurality of speakers speaking one or more languages. The universal speech model can include a plurality of speech parameters estimated based on speech from the plurality of speakers. The speaker-independent speech synthesis model can include a plurality of hidden Markov models (HMMs). A training engine can be configured to train the plurality of HMMs. The plurality of HMMs can be trained by normalizing speech data from a second speaker speaking the second language, and by using a second speaker transform that represents speaker characteristics of the second speaker. The second speaker transform can be estimated from the speech data of the second speaker, using the universal speech model. Transcription data can be generated from the input speech data by a speech recognition engine. The transcription data can be translated by a translation engine from the first language to the second language. The speech in the second language can be generated based on the translated data. Text data can be accessed in the second language and the speech can be generated based on the accessed text data.

Particular implementations of the subject matter described in this specification can be implemented so as to realize none, one, or more of the following advantages. A speech synthesizer can be configured to speak multiple languages with different voice characteristics. Speech can be synthesized in multiple languages using the voice characteristics of a particular individual, even though the individual may not actually speak or even know one or more of the multiple languages. For example, for an English speaking individual, a speech synthesizer can be configured to synthesize translated speech in German, such that the synthesized speech appears to have the voice characteristics of the English speaking individual. Speech synthesizers and translators can therefore be personalized in accordance with voice characteristics of various users.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
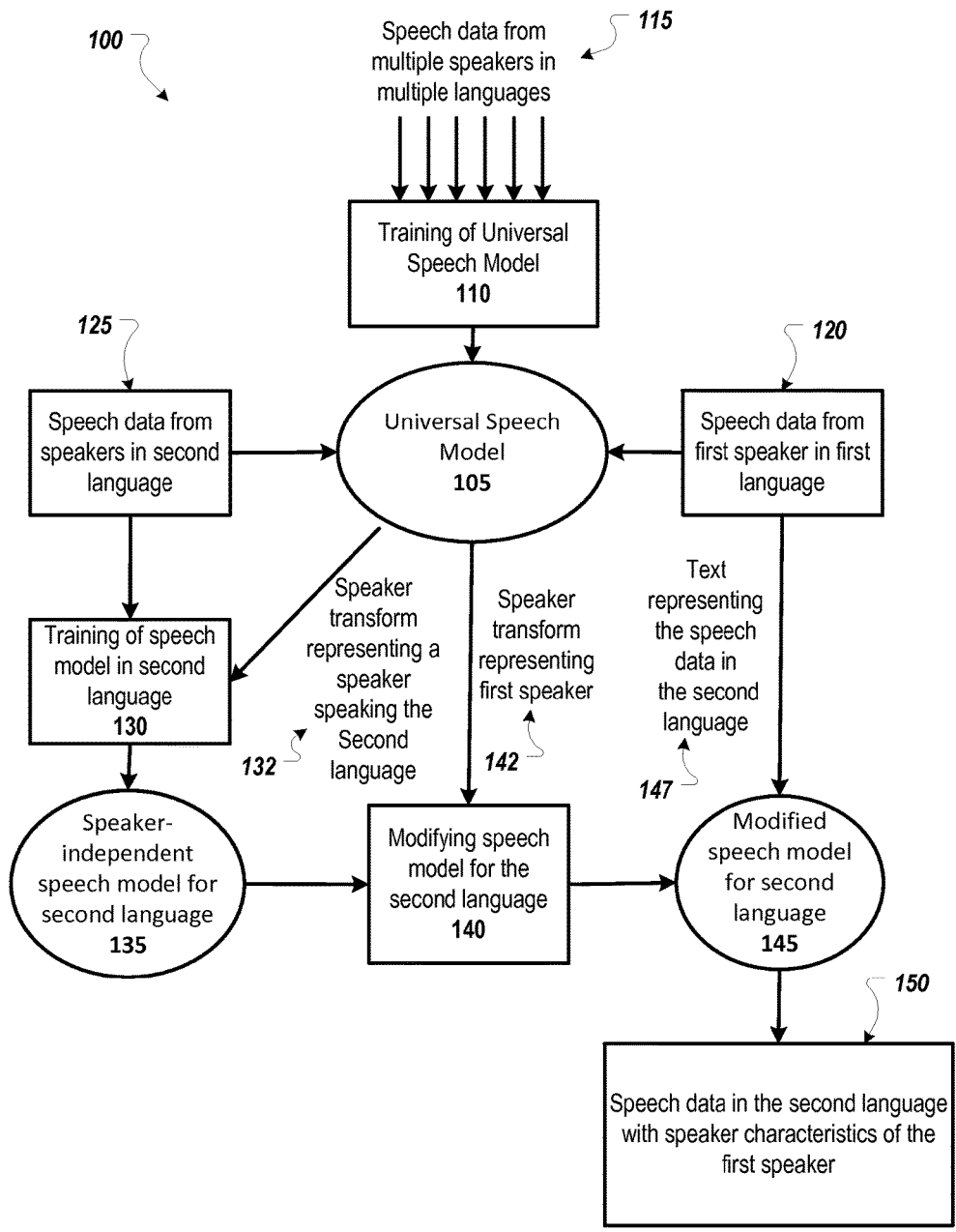
FIG. 1 is a schematic diagram representing an example of cross-lingual speaker adaptation for multi-lingual speech synthesis.

Speech synthesis is the artificial production of human speech. A speech synthesizer can be implemented as a computing device that produces speech data representing human speech. A speech synthesizer can also include an audio output device, such as a speaker, that converts the speech data into audible speech. A speech synthesizer can include multiple software or hardware modules. For example, a speech synthesizer can include a text-to-speech (TTS) system that converts text data into speech. In some implementations, a TTS system can be configured to allow people with speaking impairments to verbally communicate with others. A TTS system can also be configured to allow visually impaired individuals or individuals with reading disabilities to listen to written text.

In some implementations, a TTS synthesizer system can be configured to assign phonetic transcriptions to words included in text data. The text data can also be divided into prosodic units, such as phrases, clauses, and sentences. This process of assigning phonetic transcriptions to words is often referred to as text-to-phoneme conversion. In some implementations, the phonetic transcriptions and prosody information together make up a symbolic linguistic representation of the text data. The speech synthesizer can be further configured to convert the symbolic linguistic representation into human intelligible audible sound that represents synthesized speech. In some implementations, prosody information, such as pitch contour, phoneme durations, etc. can be imposed on the output speech.

In some implementations, it may be desirable to configure a speech synthesizer to closely resemble human voice in order to be effective. This can be achieved in various ways. In some implementations, synthesized speech can be created by using pieces of recorded human speech that are stored in a database. However, such systems can be limited by the size of the storage. Alternatively, a synthesizer can be configured to model human voice characteristics to produce a synthetic voice output. Various technologies using these two paradigms can include, for example, concatenative synthesis, unit selection synthesis, diphone synthesis, formant synthesis, articulatory synthesis, sine wave synthesis, and hidden Markov model (HMM) based synthesis.

In some implementations, a speech synthesizer can be configured to resemble the voice of a particular individual. For example, consider a video conference system where the participants speak different languages and the speech of a speaker in one language is translated into various other languages. In such a situation, it could be desirable that the synthesized versions of the translated speech include the voice characteristics of the speaker. This can be done, for example, by extracting voice characteristics (also referred to as speaker characteristics) of a particular individual from speech data in one language and providing the extracted speaker characteristics to a speech synthesizer that synthesizes speaker independent speech data in a second language. The speaker characteristics can be combined with the speaker independent speech data in the second language such that the synthesized speech in the second language appears to be spoken by the particular individual. This process is an example of cross-lingual speaker adaptation for multi-lingual speech synthesis.

Applications of such cross-lingual speaker adaptation for multi-lingual speech synthesis can include, for example, offline speech-to-speech translation, translated voice messaging, and translated video conferencing (possibly in real-time or near real-time). Applications can also include translating speech data from recorded video. For example, by using cross-lingual voice synthesis described in this document, an English movie can be heard in French even when a pre-recorded soundtrack in French is not provided with the movie file.

FIG. 1 shows a schematic diagram 100 representing an example of cross-lingual speaker adaptation for multi-lingual speech synthesis. The scheme represented in FIG. 1 can include a universal speech model 105 along with various speaker transforms. The speaker transforms represent speaker characteristics associated with various speakers of different languages. The universal speech model 105 can be obtained, for example, through a training process 110 based on speech data 115 from multiple speakers in multiple languages. In some implementations, training speech data from a large number of speakers (for example, hundreds or thousands of speakers) can be used in the training process 110 to obtain the universal speech model. The universal speech model (which may also be referred to as a universal background model) 105 can be represented, for example, using a Gaussian mixture model (GMM) or a hidden Markov model (HMM). In some implementations, information on phonemes from different languages and transcription can be avoided by representing the universal speech model as a GMM. The universal speech model can also be represented as other models, including, for example, hidden semi-Markov models (HSMM), higher order Markov models, segment models, or other acoustic models.

The training process 110 can be configured to extract speaker characteristics as transforms, e.g., linear transforms. A speaker transform for a particular speaker can be applied to a set of cepstral coefficients representing speech features. For example, a set of adapted cepstral coefficients $c_{adapted}$ can be obtained from a set of unadapted cepstral coefficients $c_{unadapted}$ as:

$$c_{adapted} = A \times c_{unadapted} + b$$

where A, b represent parameters associated with a linear transform representing a speaker transform. The speech data represented as adapted cepstral coefficients can then be normalized using the speaker transform (represented by the parameters a, b) before being used to train the universal speech model 105. The universal speech model 105 can therefore be trained in a speaker normalized space. Such a training process separates the universal speech model 105 from speaker characteristics and can be referred to as a speaker-adaptive training process. Other techniques, such as non-linear transforms or linear interpolations such as cluster adaptive training and eigenvoice estimation can also be used to represent the speaker transforms.

Various approaches can be used to compute speech parameters during the training process 110. For example, a speech parameter can be computed by extracting spectral characteristics from incoming speech data 115, for example, using a spectrogram analysis. In some implementations, a speech parameter can be obtained as cepstral coefficients computed via homomorphic deconvolution of incoming speech data. Other techniques, such as linear predictive coding or sinusoidal modeling can also be used to compute the speech parameters. In some implementations, the computed speech parameters can be stored as a part of the universal speech model 105.

In some implementations, the universal speech model can be used in cross-lingual speaker adaptation for multi-lingual speech synthesis. This is schematically shown in FIG. 1 using an example where speech data 120 in a first language is converted to speech data 150 in a second language such that the speech data 150 in the second language includes speaker characteristics of a first speaker from whom the speech data 120 originates. The speech data 150 in the second language is synthesized using a speaker independent speech model 135 for the second language. The speech model 135 can be, for example, a HMM based speech model. The speech model 135 for the second language can be obtained via a training process 130 using speech data 125 in the second language from a plurality of speakers speaking the second language.

In some implementations, the training process 130 includes training HMM based TTS models under a parametric speech synthesis frame work. This can include, for example, recording a large amount of speech in the second language from a plurality of speakers and extracting trajectories of parametric representation of the speech. The parameters used for this can include, for example, spectral or excitation parameters. A relationship, such as a HMM based relationship can then be determined between the extracted trajectories and text derived from utterances of the speakers.

In order to obtain a speaker-independent speech model 135, the speech data 125 from the plurality of speakers can be normalized with respect to suitable speaker transforms. For example, the speaker characteristics of a particular speaker speaking the second language can be analyzed to estimate a speaker transform 132 such that the estimated speaker transform 132, when applied to speech parameters from the universal speech model 105, produces the speaker characteristics of the particular speaker. The training process 130 can include normalizing the corresponding speech data 125 with the estimated speaker transform 132. This way, the training process 130 can be performed using speaker-independent speech data to obtain the speaker-independent speech model 135 for the second language.

The speech data 120 from the first speaker can also be analyzed to estimate a speaker transform 142 such that the speaker transform 142, when applied to speech parameters of the universal speech model 105, produces the speaker characteristics of the first speaker. The speaker-independent speech model 135 for the second language can then be modified by the estimated speaker transform 142 using a modification process 140 to obtain a modified speech model 145 for the second language. Text data 147 used in conjunction with the modified speech model 145 can be used to produce speech data 150 such that the speech data 150 also represents speaker characteristics of the first speaker. When rendered as human intelligible audio, the speech data 150 in the second language appears to be spoken by the first speaker. The text data 147 can be obtained, for example, from a translation engine that translates text corresponding to the speech data 120 into text in the second language. In some implementations, arbitrary text in the second language can be used as the text data 147.

Figure 2:
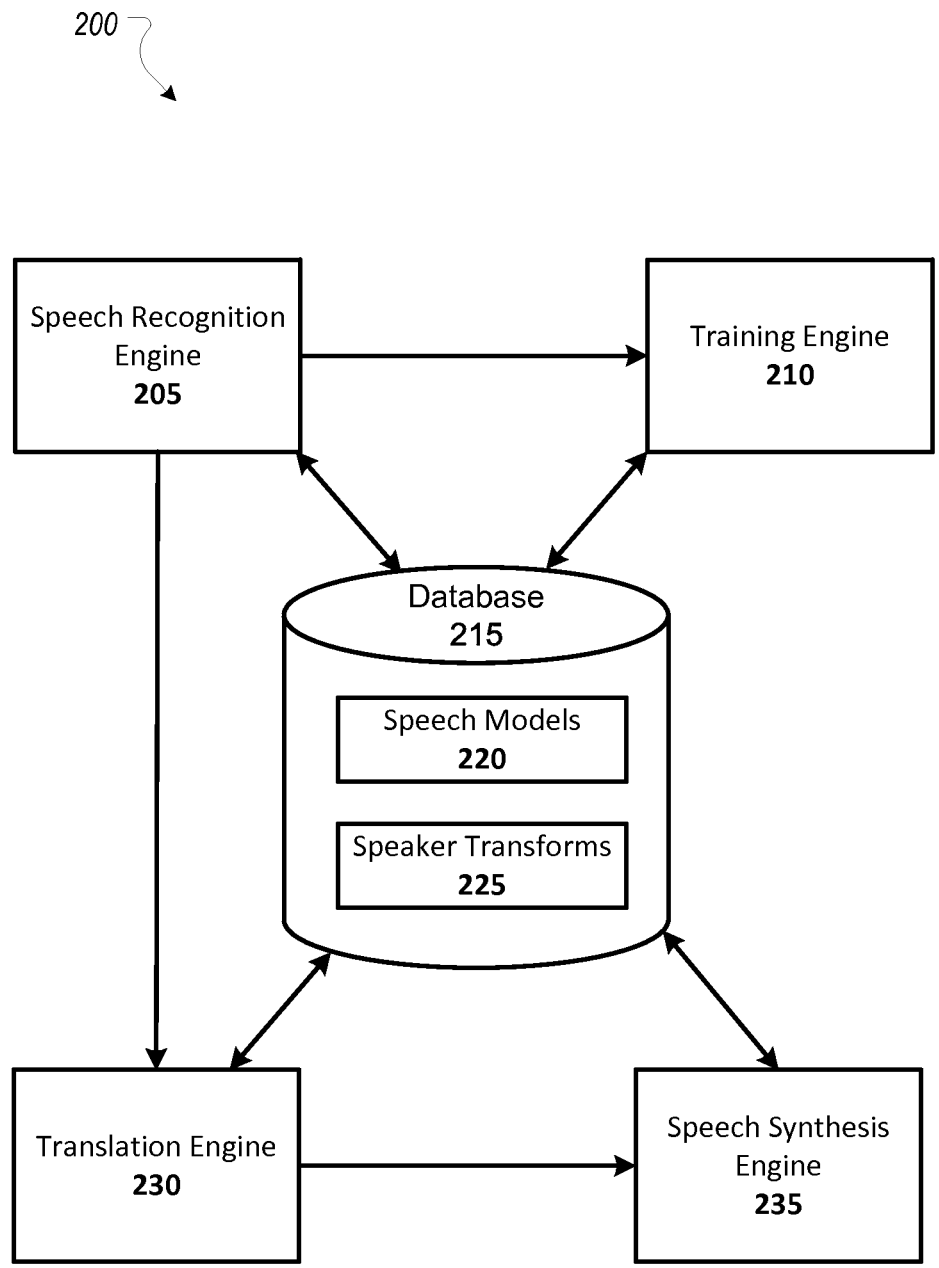
FIG. 2 is an example of a system that uses cross-lingual speaker adaptation for multi-lingual speech synthesis.

FIG. 2 is an example of a system 200 that uses cross-lingual speaker adaptation for multi-lingual speech synthesis such as described above with reference to FIG. 1. The system 200 can include, for example, a speech recognition engine 205, a training engine 210, a translation engine 230 and a speech synthesis engine 235. Two or more of these engines can be in communication with one another, possibly over a network such as a local area network (LAN), wide area network (WAN) or the internet. The system 200 can also include a database system 215 configured to store data on one or more storage device. The database system 215 can be configured to store, for example, one or more speech models 220 and speaker transforms 225.

In some implementations, the speech recognition engine 205 can be configured to recognize human speech. For example, the speech recognition engine can be configured to produce speech data from audio and/or video data, for example, data captured by a user device (e.g., a computer system) though a microphone and/or a video camera. Such audio or video data can originate from, for example, a video or audio conference session between two or more users. In some implementations, each of the users can participate in the audio/video conference session using respective user devices.

In some implementations, the speech recognition engine 205 can be implemented as a part of a user device. The user device can be any appropriate type of computing device, including but not limited to a mobile phone, smart phone, PDA, music player, e-book reader, tablet computer, laptop or desktop computer, or other stationary or portable device, that includes one or more processors and computer readable media. In some implementations, the speech recognition engine 205 can be external to a user device, and communication between the user device and the speech recognition engine 205 may take place over one or more networks including, for example, one or more of a wireless cellular network, a wireless local area network (WLAN) or Wi-Fi network, a Third Generation (3G) or Fourth Generation (4G) mobile telecommunications network, or any appropriate combination thereof.

The speech recognition engine 205 can be configured to receive and process the audio and/or video data representing human speech. In some implementations, the speech recognition engine 205 can be configured to execute application code associated with a variety of software components (e.g., modules, objects, libraries, services, and the like) for implementing one or more functional modules. The functional modules can include, for example, a recognizer that recognizes and converts utterances included in the audio/video data into text. In some implementations, the speech recognition engine 205 can also be configured to represent the recognized speech as a function of parameters and extract trajectories of such parametric representation of the speech. The parameters used for this can include, for example, spectral, cepstral or excitation parameters associated with input speech provided to the speech recognition engine 205.

In some implementations, the speech recognition engine 205 may include a speech segmentation routine for breaking sounds into sub-parts and using those sub-parts to identify words, a word disambiguation routine for identifying meanings of words, a syntactic lexicon to identify sentence structure, parts-of-speech, etc., and a routine to compensate for regional or foreign accents. The output of the speech recognition engine 205 can be a text file, such as a file containing text in a self-describing computing language, such as XML (eXtensible Markup Language) or a variant thereof. Self-describing computing languages can be useful in this context because they enable tagging of words, sentences, paragraphs, and grammatical features in a way that is recognizable to other computer programs or modules in the system 200. For example, the translation engine 230 can be configured to read the text output from the speech recognition engine 205, identify, e.g., words, sentences, paragraphs, and grammatical features, and use that information as needed.

In some implementations, the translation engine 230 reads the text file (in a first language) output by the speech recognition engine 205, and uses the text file to generate a second text file in a pre-specified target language. For example, the translation engine 230 may read an English-language text file and generate a French-language text file based on the English-language text file. In some implementations, the translation engine 230 can include, or reference, an electronic dictionary that correlates the first language to the target language. The translation engine 230 can also include, or reference, for example, a syntactic lexicon in the target language to modify word placement in the target language relative to the first language, if necessary. For example, in English, adjectives typically precede nouns. By contrast, in some languages, such as French, (most) adjectives follow nouns. The syntactic lexicon may be used to set word order and other grammatical features in the target language based on, e.g., tags contained in the English-language text file. The output of translation engine 230 can be a text file similar to that produced by the speech recognition engine 205, except that it is in the target language. The output text file of the translation engine 230 can be in a self-describing computer language, such as XML or a variant thereof.

In some implementations, the output of the speech recognition engine can be made available to a training engine 210 that is configured to compute a speech model. For example, one or more speech models (e.g. the speech model 135 described above with reference to FIG. 1) can be computed by the training engine based on training data processed by the speech recognition engine. In some implementations, the universal speech model 105 described with reference to FIG. 1 can also be computed by the training engine 210. The training engine can be implemented as any combination of one or more software components (e.g., modules, objects, libraries, services, etc.) and/or hardware components (e.g. microprocessor, microcontroller, digital signal processor, etc.).

The system 200 also includes a speech synthesis engine 235 that synthesizes speech data based on, for example, text data provided by the translation engine 230. In some implementations, the speech synthesis engine 235 can be configured to predict speech parameter trajectories based on the text from which speech is synthesized. Speech waveform can then be synthesized from the predicted speech parameter trajectories. In some implementations, the speech synthesis engine can be configured to synthesize speech based on a speech model 220 stored in the database system 215. In some implementations, when synthesizing speech in a particular language, the speech synthesis engine 235 can be configured to use an appropriate speaker-independent speech model, such as the speech model 135 described with reference to FIG. 1. For example, the speech parameter trajectories (including, for example, frequency spectrum, fundamental frequency, and prosody) can be predicted from an appropriately trained HMM. The speech waveforms can then be generated from the HMM based on, for example, a maximum likelihood criterion. In some implementations, the speech synthesis engine 235 can be configured to use a modified speech model such as the speech model 145 described with reference to FIG. 1. The modified speech model used by the speech synthesis engine 235 can be based on a speaker transform 225 stored in the database system 215. In some implementations, the speaker transform 225 can represent speaker characteristics of a speaker who does not speak the language corresponding to an output of the speech synthesis engine 235.

The database system 215 can be configured to store the speech models 220 and the speaker transforms 225 used in the multi-lingual speech synthesis system 200. The database system 215 can be implemented on a storage device located, for example, on a server. The database system 215 can be configured to store the speech models 220 including, for example, one or more of the universal speech model 105, speaker-independent speech model 135, and modified speech model 145 described with reference to FIG. 1. The database system 215 can also be configured to store the speaker transforms 225. The speaker transforms 225 can include, for example, the speaker transforms 132 and 142 described with reference to FIG. 1. The database system 215 can be in communication with other sub-systems of the system 200, including, for example, the speech recognition engine 205, the training engine 210, the translation engine 230 and the speech synthesis engine 235.

Figure 3:
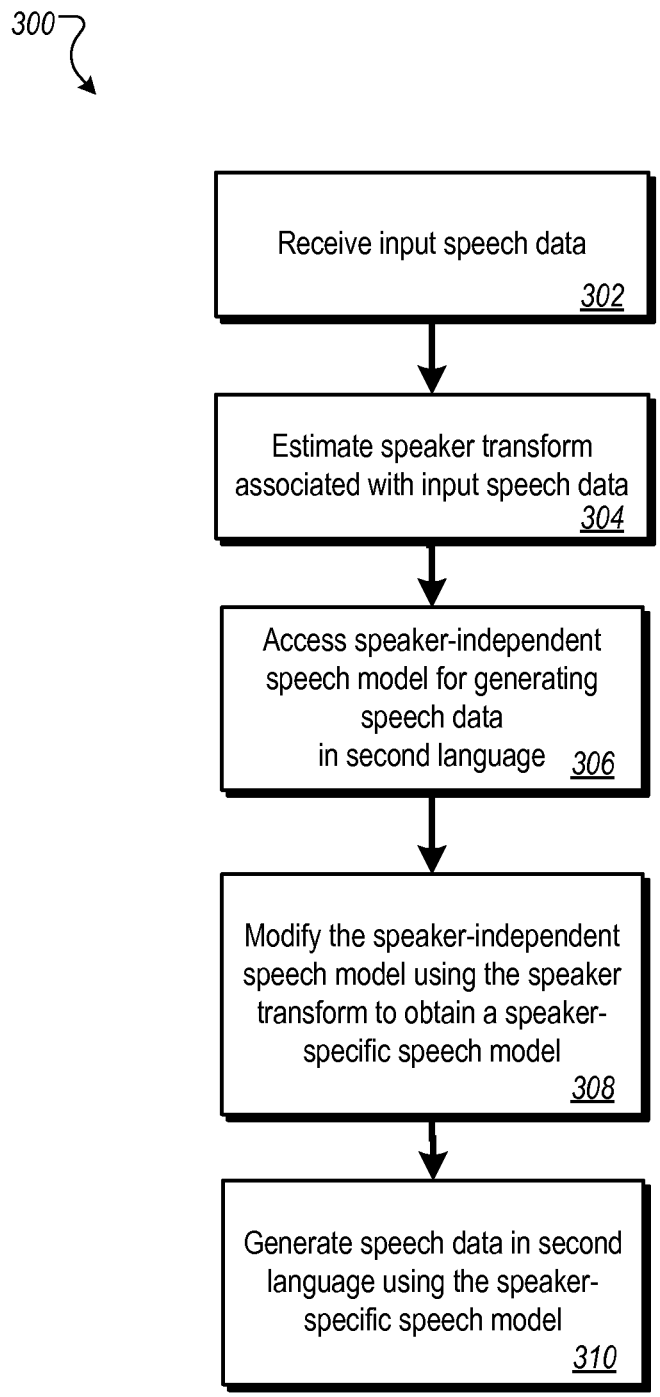
FIG. 3 is a flow diagram of an example process for generating speech data.

FIG. 3 shows a flow diagram of an example process 300 for generating speech data. In some implementations, at least some operations of the process 300 can be performed within a multi-lingual speech synthesis system such as the system 200 described with reference to FIG. 2. The process can include receiving input speech data (302). The input speech data can be received in various forms, including, for example, text and audio. In some implementations, the input speech data can be received from, for example, a speech recognition engine 205 or a translation engine 230 described with reference to FIG. 2. The input speech data can be based on speech in a source language.

The process 300 can also include estimating a speaker transform associated with the speech data (304). For example, the speaker transform can represent the speaker characteristics of the individual who provides the speech in the source language. In some implementations, the speaker transform estimation can be carried out by a computing device that is a part of a sub-system of the system 200 described with reference to FIG. 2. For example, the speaker transform estimation can be carried out at the speech recognition engine 205. In some implementations, the speaker transform can be estimated using a speech model such as the universal speech model 105 described with reference to FIG. 1. The estimated speaker transform can be stored in a storage device, for example, as a part of the database system 215.

The process 300 also includes accessing a speaker-independent speech model to generate speech data in a second language that is different from the source language (306). The second language can be the target language in which the synthesized speech is produced. In some implementations, the speaker-independent speech model can be substantially similar to the speech model 135 described with reference to FIG. 1. The speaker-independent speech model can be stored as a part of the speech models 220 within the database system 215. The speaker-independent speech model can be accessed, for example, by the speech synthesis engine 235 in response to receiving translated speech data from a translation engine 230.

The process 300 can further include modifying the speaker-independent speech model using the estimated speaker transform to obtain a speaker-specific speech model (308). This can include, for example, applying the estimated speaker transform to the speaker-independent speech model. For example, if the speaker-independent speech model is represented using an HMM, speech parameter trajectories can be estimated by applying the speaker transform on the HMM. In some implementations, the speaker-independent speech model can be modified by a speech synthesis engine 235. Alternatively, the modification can be done offline by a computing device and stored as a part of the speech models 220 within the database system 215.

The process 300 also includes generating speech data in the second language using the speaker-specific speech model (310). This can include, for example, synthesizing speech waveform from estimated speech parameter trajectories at a speech synthesis engine 235. In some implementations, this can also include generating human intelligible audible speech using an output device such as a headphone, earphone or speaker. In some implementations, generating the speech data can include generating transcription data from the speech data in the source language and translating the transcription to text data in the second language. The speech data can then be generated based on the translated text in the second language. Because the speech data is generated using a speaker-specific speech model, the generated speech sounds as if spoken by the individual who provided the input speech data in the source language.

Figure 4:
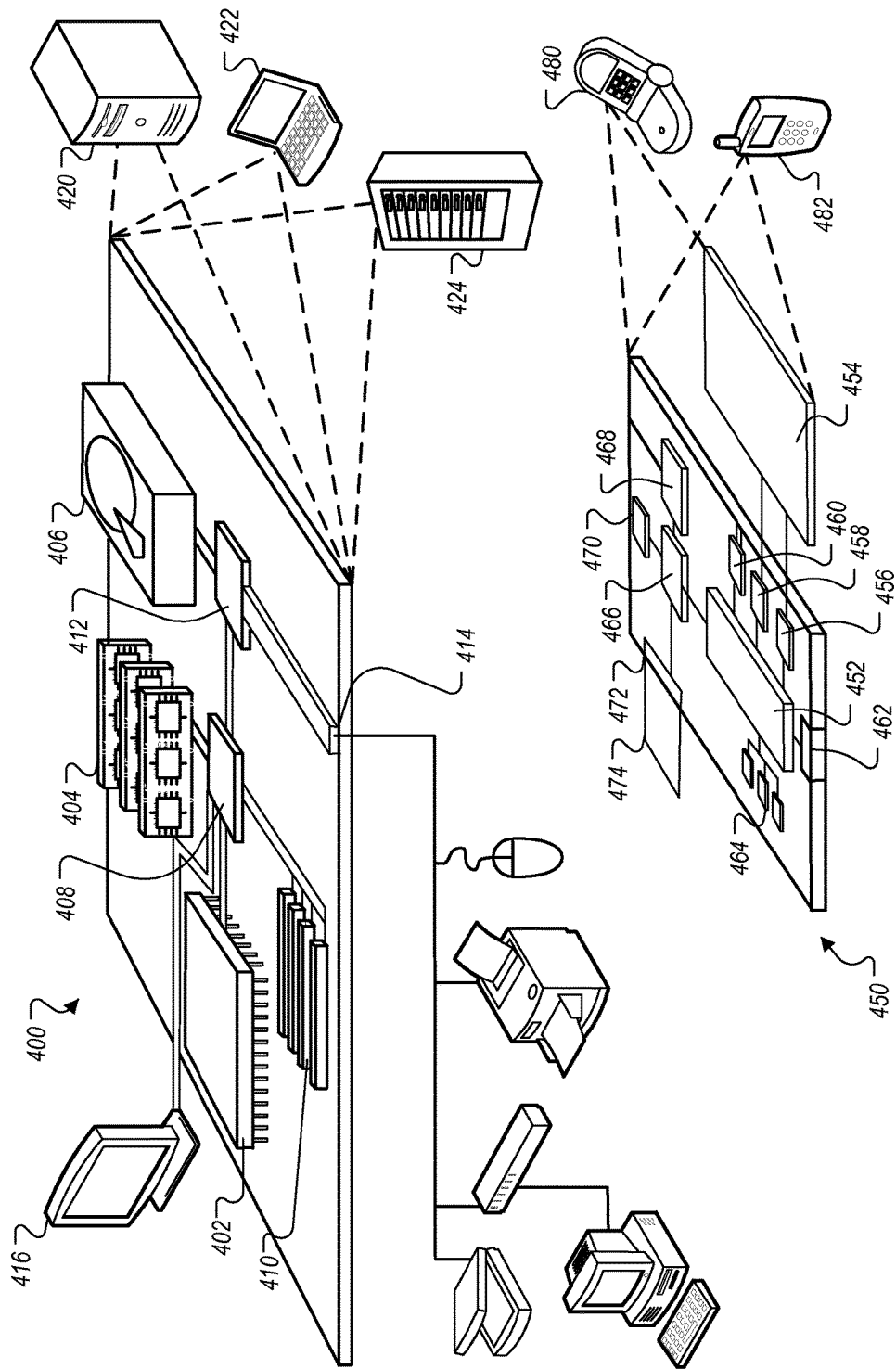
FIG. 4 shows an example of a computer device and a mobile computer device that can be used to implement the techniques described here.

FIG. 4 shows an example of a generic computer device 400 and a generic mobile computer device 450, which may be used with the techniques described here. For example, the computing device 400 or 450 can be used to implement at least a portion of the multi-lingual speech synthesis system described above with reference to FIG. 2. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. The components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing at least a portion of the operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device, such as the device 450. Such devices can include one or more of the computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. The components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the present disclosure. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:
1. A method comprising:
    receiving input speech data from a speaker in a first language;
    estimating, by a processor, based on a universal speech model, a set of speaker transform coefficients representing speaker characteristics associated with the input speech data;
    accessing a speaker-independent speech model for generating speech data in a second language that is different from the first language;
    modifying, by a processor, cepstral coefficients of the speaker-independent speech model using the estimated speaker transform coefficients to obtain cepstral coefficients of a speaker-specific speech model; and generating speech data in the second language using the speaker-specific speech model.

2. The method of claim 1, wherein the universal speech model includes a Gaussian mixture model that represents a plurality of speakers speaking one or more languages.

3. The method of claim 2, wherein the universal speech model includes a plurality of speech parameters estimated based on speech from the plurality of speakers.

4. The method of claim 1, wherein the speaker-independent speech model includes a plurality of hidden Markov models (HMMs).

5. The method of claim 4 further comprising training the plurality of HMMs by normalizing speech data from a second speaker speaking the second language, and by using a second speaker transform that represents speaker characteristics of the second speaker.

6. The method of claim 5, further comprising estimating the second speaker transform from the speech data of the second speaker.

7. The method of claim 1, wherein generating the speech in the second language comprises:
generating transcription data from the input speech data;
translating the transcription data from the first language to the second language; and
generating the speech based on the translated data.

8. The method of claim 1, wherein generating the speech in the second language comprises:
accessing text data in the second language; and
generating the speech based on the accessed text data.

9. A system comprising:
a speech synthesis engine including a processor, the speech synthesis engine configured to:
receive input speech data from a speaker in a first language,
estimate, based on a universal speech model, a speaker transform representing speaker characteristics associated with the input speech data,
access a speaker-independent speech model for generating speech data in a second language that is different from the first language,
modify the speaker-independent speech model using the speaker transform to obtain a speaker-specific speech model, and
generate speech data in the second language using the speaker-specific speech model.

10. The system of claim 9, wherein the universal speech model includes a Gaussian mixture model that represents a plurality of speakers speaking one or more languages.

11. The system of claim 10, comprising a training engine configured to estimate a plurality of speech parameters of the universal speech model, based on speech from the plurality of speakers.

12. The system of claim 10, wherein the speaker-independent speech model includes a plurality of hidden Markov models (HMMs).

13. The system of claim 12 comprising a training engine configured to train the plurality of HMMs by normalizing speech data from a second speaker speaking the second language, and by using a second speaker transform that represents speaker characteristics of the second speaker.

14. The system of claim 13, wherein the training engine is configured to estimate the second speaker transform from the speech data of the second speaker.

15. The system of claim 9 comprising:
a speech recognition engine configured to generate transcription data from the input speech data; and
a translation engine configured to translate the transcription data from the first language to the second language, and provide the translated data to the speech synthesis engine for generating the speech data in the second language.

16. The system of claim 9 wherein the speech synthesis engine is configured to access text data in second language, and generate the speech based on the accessed speech data.

17. A computer program product comprising computer readable instructions encoded on a storage device, the instructions configured to cause one or more processors to:
receive input speech data from a speaker in a first language,
estimate, based on a universal speech model, a set of speaker transform coefficients representing speaker characteristics associated with the input speech data,
access a speaker-independent speech model for generating speech data in a second language that is different from the first language,
modify cepstral coefficients of the speaker-independent speech model using the estimated speaker transform coefficients to obtain cepstral coefficients of a speaker-specific speech model, and
generate speech data in the second language using the speaker-specific speech model.

18. The computer program product of claim 17, wherein the universal speech model includes a Gaussian mixture model that represents a plurality of speakers speaking one or more languages.

19. The computer program product of claim 18, wherein the universal speech model includes a plurality of speech parameters estimated based on speech from the plurality of speakers.

20. The computer program product of claim 17, wherein the speaker-independent speech model includes a plurality of hidden Markov models (HMMs).

21. The computer program product of claim 20, wherein the computer readable instructions include instructions for training the plurality of HMMs by normalizing speech data from a second speaker speaking the second language, and by using a second speaker transform that represents speaker characteristics of the second speaker.

22. The computer program product of claim 21, wherein the computer readable instructions include instructions for estimating the second speaker transform from the speech data of the second speaker.

23. The computer program product of claim 17, wherein the computer readable instructions include instructions for:
generating transcription data from the input speech data;
translating the transcription data from the first language to the second language; and
generating the speech based on the translated data.

24. The computer program product of claim 17, wherein the computer readable instructions includes instructions for:
accessing text data in the second language; and
generating the speech based on the accessed text data.

25. A method comprising:
receiving input speech data from a speaker in a first language;
estimating, by a processor, a set of speaker transform coefficients representing speaker characteristics associated with the input speech data, wherein the speaker transform is one of a linear transform and a non-linear transform;
accessing a speaker-independent speech model for generating speech data in a second language that is different from the first language;

modifying the speaker-independent speech model using the estimated speaker transform coefficients to obtain a speaker-specific speech model; and generating speech data in the second language using the speaker-specific speech model.

26. The method of claim 25, wherein the speaker specific speech model includes a set of adapted coefficients obtained by applying the speaker transform to a set of unadapted coefficients from the speaker-independent speech model.

* * * * *